United States Patent
Kriegel et al.

(10) Patent No.: US 10,549,994 B2
(45) Date of Patent: Feb. 4, 2020

(54) METHOD AND ARRANGEMENT FOR THE PRODUCTION AND THERMAL COMPRESSION OF OXYGEN

(71) Applicant: Fraunhofer-Gesellschaft zur Foerderung der angewandten Forschung e.V., Munich (DE)

(72) Inventors: Ralf Kriegel, Kahla (DE); Robert Kircheisen, Jena (DE); Matthias Schulz, Weimar OT Legefeld (DE); Claudia Sonnenberg, Eisenberg (DE)

(73) Assignee: FRAUNHOFER-GESELLSCHAFT ZUR FOERDERUNG DER ANGEWANDTEN FORSCHUNG E. V., Munich (DE)

( * ) Notice: Subject to any disclaimer, the term of this patent is extended or adjusted under 35 U.S.C. 154(b) by 263 days.

(21) Appl. No.: 15/522,845

(22) PCT Filed: Oct. 27, 2015

(86) PCT No.: PCT/DE2015/100450
§ 371 (c)(1),
(2) Date: Apr. 28, 2017

(87) PCT Pub. No.: WO2016/066160
PCT Pub. Date: May 6, 2016

(65) Prior Publication Data
US 2017/0320733 A1    Nov. 9, 2017

(30) Foreign Application Priority Data
Oct. 30, 2014    (DE) .................... 10 2014 115 849

(51) Int. Cl.
*B01D 53/22*    (2006.01)
*C01B 13/02*    (2006.01)
(Continued)

(52) U.S. Cl.
CPC ........ *C01B 13/0255* (2013.01); *B01D 53/228* (2013.01); *B01D 53/265* (2013.01); *B01D 71/024* (2013.01)

(58) Field of Classification Search
CPC ............ B01D 71/024; B01D 2257/102; B01D 53/265; B01D 2258/06; B01D 2257/104;
(Continued)

(56) References Cited

U.S. PATENT DOCUMENTS 2,596,587 A *   5/1952   Morton ..................... F16T 1/22
                                                                137/166
4,673,415 A *   6/1987   Stanford ................ B01D 53/04
                                                                95/19

(Continued)

FOREIGN PATENT DOCUMENTS

DE    102013103426 A1   10/2014
EP       0916384 A1     5/1999
(Continued)

OTHER PUBLICATIONS

Adrian Leo et al: "Production of pure oxygen from BSCF hollow fiber membranes using steam sweep" Separation and Purification Technology. Elsevier Science Amsterdam. NL vol. 78. No. 2. Feb. 3, 2011 (Feb. 3, 2011). pp. 220-227.
(Continued)

*Primary Examiner* — Anthony R Shumate
(74) *Attorney, Agent, or Firm* — Abel Schillinger, LLP

(57) ABSTRACT

The invention relates to a method and an arrangement for the continuous production of compressed oxygen from air using mixed conducting ceramic membranes. The aim of the invention is to provide a way of isolating pure oxygen from the air and compressing said oxygen to pressures above the ambient pressure, without using mechanical or electromechanical compression of air or oxygen. To achieve this aim,
(Continued)

according to the invention water in various aggregate states is conducted in a circuit and the configuration of the equipment is designed such that the desired high oxygen pressure is produced in a separate area from the membrane module and the oxygen produced is prevented from mixing with the freshly produced water vapour.

6 Claims, 4 Drawing Sheets

(51) Int. Cl.
  *B01D 53/26* (2006.01)
  *B01D 71/02* (2006.01)
(58) Field of Classification Search
  CPC .............. B01D 53/228; B01D 2256/12; C01B 13/0255; C01B 13/0251; Y02P 20/129
  See application file for complete search history.

(56) References Cited

U.S. PATENT DOCUMENTS

| | | | | |
|---|---|---|---|---|
| 4,968,329 | A * | 11/1990 | Keefer | F02G 1/0435 95/98 |
| 5,056,327 | A * | 10/1991 | Lammert | F25B 47/022 62/151 |
| 5,582,754 | A | 12/1996 | Smith et al. | |
| 5,865,877 | A * | 2/1999 | Delp, II | B01D 53/22 95/12 |
| 5,935,298 | A | 8/1999 | Prasad et al. | |
| 5,964,922 | A | 10/1999 | Keskar et al. | |
| 7,771,520 | B1 * | 8/2010 | Bossard | B01D 53/228 423/644 |
| 2002/0121191 | A1 * | 9/2002 | Warren | B01D 53/047 95/11 |
| 2003/0056647 | A1 | 3/2003 | Gottzmann | |
| 2011/0192182 | A1 * | 8/2011 | Noda | B01D 53/261 62/160 |
| 2013/0059150 | A1 * | 3/2013 | Diniz Da Costa | B01D 53/228 428/398 |
| 2014/0216105 | A1 * | 8/2014 | Favero | B01D 53/261 62/640 |
| 2015/0083121 | A1 * | 3/2015 | Fisher | A61M 16/024 128/202.22 |
| 2016/0040081 | A1 | 2/2016 | Kriegel | |
| 2017/0356647 | A1 * | 12/2017 | Mezghani | F23L 7/007 |
| 2018/0193806 | A1 * | 7/2018 | Zheng | B01D 53/228 |
| 2019/0022590 | A1 * | 1/2019 | Yu | B01D 61/145 |

FOREIGN PATENT DOCUMENTS

| | | |
|---|---|---|
| EP | 0916385 A1 | 5/1999 |
| WO | 2011073889 A1 | 6/2011 |

OTHER PUBLICATIONS

Wang H et al: "Production of high-purity oxygen by perovskite hollow fiber membranes swept with steam." Journal of Membrane Science. Elsevier BV. NL. vol. 284. No. 1-2. Nov. 2006 (Nov. 2006) pp. 5-8.

* cited by examiner

METHOD AND ARRANGEMENT FOR THE PRODUCTION AND THERMAL COMPRESSION OF OXYGEN

BACKGROUND OF THE INVENTION

1. Field of the Invention

The invention relates to a method and an arrangement for continuous generation of compressed oxygen from air, using mixed-conduction ceramic membranes.

2. Discussion of Background Information

Oxygen is conventionally produced preferentially by Pressure Swing Adsorption (PSA) or by cryogenic air separation (Linde® process), with both processes being operated using electrical energy. For subsequent processes the oxygen is usually required at superatmospheric pressure, in order to be able to overcome the pressure drops in the downstream processes and in the conduit systems. For recompression, it is normal to use electromechanical compressors which, because of their suitability for compression of oxygen, give rise to high capital costs, consume electrical energy additionally, and pose a considerable safety risk, as documented by corresponding accidents.

An alternative method for production of oxygen is based on a high-temperature membrane separation process. This process employs mixed-conduction ceramic membranes (MIECs—Mixed Ionic Electronic Conductors), which permit highly selective separation of oxygen. Oxygen transport is based on the transport of oxide ions through the gastight ceramic material, and on the parallel transport of electronic charge carriers (electrons or defect electrons).

The permeation of oxygen through an MIEC membrane can be described by the Wagner equation and is determined in particular by the ambipolar conductivity of the material at service temperature, the membrane thickness, and the driving force. The latter is dictated by the logarithmic ratio of the oxygen partial pressure in the feed gas ($p_h$) to the oxygen partial pressure in the purge gas ($p_1$) or in the permeate. For a given material, constant membrane thickness, and specific temperature, accordingly, the flow of oxygen through an MIEC membrane is proportional to $\ln(p_h/p_1)$. Consequently, a doubling of $p_h$ on the feed gas side results in the same increase in oxygen flow as does a halving of $p_1$ on the permeate or sweep gas side.

For the generation of pure oxygen in industrial membrane plants, accordingly, the air can be compressed or the oxygen can be drawn off under suction with reduced pressure; of course, combined processes are also possible (Armstrong, P. A., Bennett, D. L., Foster, E. P., Stein, V. E.: The New Oxygen Supply for the New IGCC Market. Gasification Techn. 2005, San Francisco, Oct. 9-12, 2005). For large industrial plants, preference is generally given to air compression, since compressors tend to be cheaper and more readily available than reduced pressure generators.

If the oxygen generated is needed for chemical reactions, the driving force can be generated most favorably in terms of energy by purging of the MIEC membrane using low-oxygen gases. In order to boost the flow of oxygen through the membrane and to provide oxygen with sufficiently high pressure for downstream processes, the air on the feed gas side is typically compressed using mechanical compressors and, after the membrane module, the compression energy is recovered to a large extent from the oxygen-depleted air by means of an expansion turbine.

The use of steam as a sweep gas in MIEC membrane plants is known in principle, but in that case likewise typically the air is compressed beforehand (U.S. Pat. No. 5,582,754 A, EP 0 916 385 A1). Simple laboratory constructions utilize mixtures of steam and inert gas, the latter being used in order to realize a defined gas throughput (Wang, H., Kolsch, P., Schiestel, T., Tablet, C., Werth, S., Caro, J.: Production of high-purity oxygen by perovskite hollow fiber membranes swept with steam. J. of Membr. Sc. 284 (2006), page 5).

In accordance with the theoretical principles, the expectation for the process outlined is that the passage of the oxygen through the membrane into the steam leads only to an oxygen content which corresponds to that of the air supplied on the feed side. If the oxygen partial pressures are the same on both sides of the membrane, the result is a ratio of the oxygen partial pressures of 1, and the driving force $\ln(p_h/p_1)$ for the transport process becomes 0. The process, accordingly, will come to a standstill, since a concentration equilibrium is established. In the arrangements which have been described, this has to date been prevented by realizing a continuous gas flow using an inert gas. In this way, however, it is not possible to obtain pure oxygen, since this oxygen always contains other gases.

The possibility of generating pure oxygen using steam as the purge gas appears obvious if a sufficient gas flow is realized with steam alone, i.e., without addition of other gases. In a half-open system of this kind, however, where on the gas side there is pressure equalization with the environment and gas exchange with this environment is possible, ambient pressure will always prevail. The development of a superatmospheric pressure is unlikely, since this superatmospheric pressure also leads to a higher oxygen partial pressure on the sweep gas side in comparison to the feed gas side. The transport process would therefore come to a standstill or, in the event of a higher oxygen partial pressure on the sweep gas side, would switch round.

Generation of pure, compressed oxygen appears to be possible, using the known arrangements and methods, only with mechanical compression of the feed gas or of the separated oxygen, as is also described in accordance with the prior art.

The object on which the invention is based is that of specifying a possibility for separating the pure oxygen from the air and compressing it to pressures above the ambient pressure, the intention being to carry out such compression without mechanical or electromechanical compression of air or oxygen.

SUMMARY OF THE INVENTION

In accordance with the invention, the objective is achieved by passing water in various aggregate states in a circuit and designing the apparatus relationships in such a way that the desired high oxygen pressure is generated spatially separately from the membrane module, and the mixing of the generated oxygen with the freshly generated steam is avoided.

The membrane separation process of the invention for generating compressed oxygen using mixed-conduction membranes and employing steam as purge gas is characterized in that air at ambient pressure is used and there is no mechanical compression of gases; in that, on the contrary, there is thermal compression of the oxygen to pressures above ambient pressure, by passing the gas mixture emerging from the membrane module through nonreturn valves and so preventing the gaseous oxygen being transported back into the membrane module and onto the mixed-conduction membranes; in that liquid, hot water is utilized for separating the gaseous oxygen from the evaporator compartment; in that the water is passed in the circuit and the oxygen pressure is regulated by the opposing pressure at the oxygen outlet. In particular, the steam volume flow is set at 0.1 times to 3 times the air volume flow, and the return flow of the oxygen into the membrane module is prevented by a nonreturn valve, with achievement of a flow rate in the product gas flow of more than 0.2 m/s within the nonreturn valve, through cross-sectional narrowing or comparable measures. A particular advantage is that electrical energy can be generated from the product gas mixture under pressure, by means, for example, of expanding the gas mixture of steam and oxygen in steam turbines or steam motors.

In one advantageous embodiment, the membrane component itself is utilized as a pressuretight shell, so there is no need for a separate pressure vessel. The mixed-conduction membrane used is a tube of the material BSCF (BSCF—$Ba_{0.5}Sr_{0.5}Co_{0.8}Fe_{0.2}O_{3-\delta}$) having a length of 500 mm, an external diameter of 10 mm, and a wall thickness of 1 mm, which is closed on one side.

Disposed within the membrane tube is a thinner introduction tube with an external diameter of approximately 4 mm, which guides the $H_2O$ vapor to the inner closed end of the membrane tube. The open cross section of the resultant interspace between membrane tube and concentrically installed introduction tube is designed in such a way, by means of the diameters used, that a gas-mixture flow rate of 0.45 m/s is achieved along the tube axes as early as in the interspace of the tubes under the operating conditions set out below. The entire interspace between introduction tube and membrane tube therefore constitutes an integrated nonreturn-flow valve for the gas mixture $H_2O(g)/O_2$.

Membrane tube and introduction tube are sealed concentrically and in a gastight manner into a metallic connection block, using conventional polymer seals or by welding, for example. The connection block with the vertical membrane tube is installed in an oven which is not pressuretight and which can be flushed with air. In terms of height, the transition region between metal and oven is adjusted and/or varied by introduced insulating material in such a way that the boiling temperature of the water there is exceeded everywhere in the connection block, but without jeopardizing the integrity of the seals and hose lines used.

The evaporator used is a two-neck flask (0.5 l) which is filled with 350 ml of water. The evaporator is supplied with thermal energy, and so the water begins to boil and evaporates. The steam is supplied via an extremely short hose line to the connection block and is passed via the introduction tube to the mixed-conduction membrane. At sufficiently high temperature of the oven and of the membrane, the oxygen from the oven atmosphere enters the steam through the membrane wall, since the oxygen partial pressure in the steam is substantially lower than in the oven atmosphere.

The $H_2O(g)/O_2$ gas mixture is passed from the connection block with a hose to the lower end of a vertical condenser which is cooled with ambient air and consists of a perpendicular or inclined copper tube with pressed-on sheet-metal plates and a length of 50 cm, Located at the top of the condenser is a water-filled bubble counter, from which in operation the oxygen exits, overcoming the ambient pressure and the opposing hydrostatic pressure of the liquid in the bubble counter. At the same time, the lower end of the condenser is joined to a hose siphon, which consists only of a hose loop. Condensate collects in this hose loop and subsequently overflows. The overflow height of the hose siphon is set at 0.5 to 2 cm, and so only a small amount of liquid water is located in the hose loop of the hose siphon, the opposing hydrostatic pressure from the water present in the siphon is low, and nevertheless separation of the various gas phases in condenser and evaporator by the liquid in the siphon is ensured. The water overflowing at the siphon is introduced into a two-neck flask (0.25 l) which serves as condensate collector and safety bottle. From the condensate collector, excess liquid water is removed beneath the liquid level and returned to the evaporator. In the evaporator, the water, which is still hot, evaporates again.

At start of operation, the oven with the membrane tube and with the connection block situated on the oven is first heated to around 850° C. The evaporator is subsequently supplied with heat until the water boils and evaporates. After that, heat is supplied continually in a quantity such that around 12 g of water are evaporated per hour, corresponding to around 15 standard liters of steam per hour. The oven compartment surrounding the membrane tube is flushed with around 30 sl (standard liters) of air per hour, after the operating temperature has been reached. At the bubble counter above the condenser, with 400 mm heated length of the BSCF membrane tube (approximately 300 mm membrane length at 850° C.) and with the stated throughputs, about 2.5 sl of oxygen per hour are generated.

BRIEF DESCRIPTION OF THE DRAWINGS

The invention is to be elucidated in more detail below by means of exemplary embodiments. For this purpose

DETAILED DESCRIPTION OF EMBODIMENTS OF THE INVENTION

Figure 1:
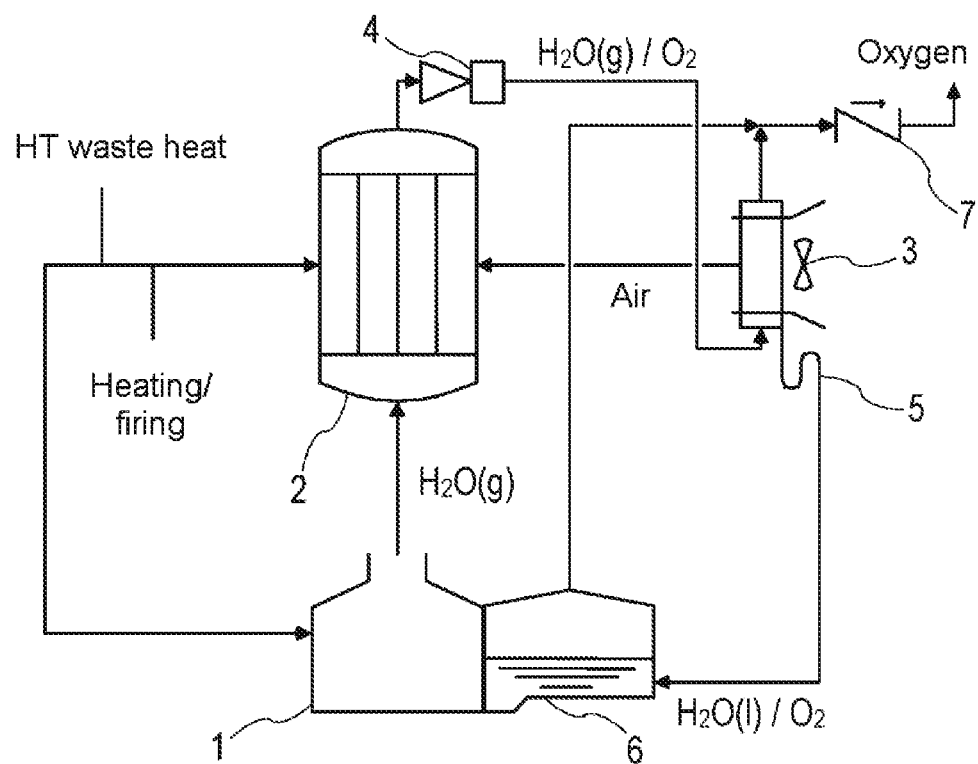
FIG. 1 shows a method scheme for generation of compressed oxygen.

The method principle of the invention is to be elucidated using FIG. 1. First of all, liquid water is evaporated in an evaporator 1 and is passed within a membrane module 2 to the MIEC membrane (sweepgas side), which is heated by waste heat or otherwise. The oxygen permeates from the uncompressed feed gas air through the membrane into the steam, since its oxygen partial pressure ($p_l$) is initially much lower than the oxygen partial pressure ($p_h$) on the air side, especially close to the steam entry. Along the membrane surface receiving steam flow, the steam becomes increasingly rich in oxygen, and the pressure remains virtually the same but there is an expansion in volume. The gas mixture of steam and oxygen, after contact with the membrane, is supplied to a condenser 3, which very largely condenses steam out again and supplies the water in liquid form to the evaporator 1 again.

In accordance with the invention, the establishment of an equilibrium of the oxygen partial pressures is prevented by setting the steam volume flow at levels from 0.1 times up to 3 times the air volume flow. As a result, oxygen is carried continually out of the membrane module 2, and new, virtually oxygen-free steam is introduced into the membrane module 2. At the same, the flow rate of the steam/oxygen mixture is adjusted, through reduction in the free flow cross sections, in such a way that the flow rate exceeds 0.2 m/s during and, in particular, after membrane contact, but at least within a nonreturn valve 4. Consequently, return flow of the generated oxygen to the membrane, the corresponding reduction in the driving force $\ln(p_h/p_1)$, and the establishment of the equilibrium of the oxygen partial pressures are avoided.

Within the condenser 3, the gas mixture is introduced into liquid water, and consequently cooled, and the steam is very largely separated in the forth of liquid water, which runs downward. The introduction is accomplished such that the oxygen ascending in gaseous form within the water passes into a separate gas reservoir, and therefore is separated by liquid water in the condenser 3 from the inflowing gas mixture of steam and oxygen. This can be realized in a simple manner by means of a siphon 5 and/or by a submerged siphon (not shown) at the point of entry of the gas mixture into the condenser 3. The liquid water then passes into a liquid separator or condensate collector 6, in which finely divided oxygen bubbles that have still remained are separated off by calming of the liquid. To improve pressure equalization in the gas phase, an equalization line can be taken, starting from the gas space of the condensate collector 6, to the top of the condenser 3 and/or to the oxygen line that goes off there. Oxygen collecting in the upper, gas phase of the condenser 3 is pure but moist. The moisture content of the oxygen can be adjusted ahead of the pressure control valve 7 by condensation at defined temperature, with the condensate advantageously being returned to the water circuit. The system pressure and the oxygen pressure are mandated at the pressure reducer and/or at the pressure control valve 7.

The liquid water is passed back from the condensate collector 6 into the evaporator 1; a sufficiently high fill level of the liquid water in condensate collector 6 and evaporator 1 prevents contact between oxygen and freshly generated steam in the gas phase. Since water at close to its boiling point contains only small amounts of dissolved gases, steam with only a low oxygen fraction is always generated in the evaporator 1, and so the low oxygen partial pressure ($p_1$) that is needed for oxygen permeation is obtained in turn at the MIEC membrane.

Oxygen compression is therefore accomplished primarily through the pressure of the steam. Furthermore, there is an automatic compression through the oxygen which enters the half-open system via the membrane. This takes place not only at ambient pressure, i.e., at approximately 1 bar, but also at high superatmospheric pressure of the steam, since nonreturn valve 4 and liquid-phase barrier separate the isolated gaseous oxygen from the mixed-conduction membrane.

Even without opposing pressure at the gas outlet of the system, in other words at ambient pressure of the steam, therefore, the overall pressure in the system is increased. In the equilibrium case, a system pressure of around 1.2 bar can be achieved even in the first evaporation and condensation cycle. If an opposing pressure is deliberately set at the pressure control valve 7, and if, moreover, the evaporator 1 is supplied with more heat energy than is taken off at the condenser 3, then, in the same way as in a conventional steam generator, the pressure in the system gradually rises until it reaches this set opposing pressure. On account of the circuit, which is virtually a closed circuit in terms of the water, this pressure increase is transferred to the oxygen. Accordingly, there are no fundamental limits, but instead only technical limits, of the kind which also apply to technical steam generation, on the thermal compression of the oxygen.

Figure 2:
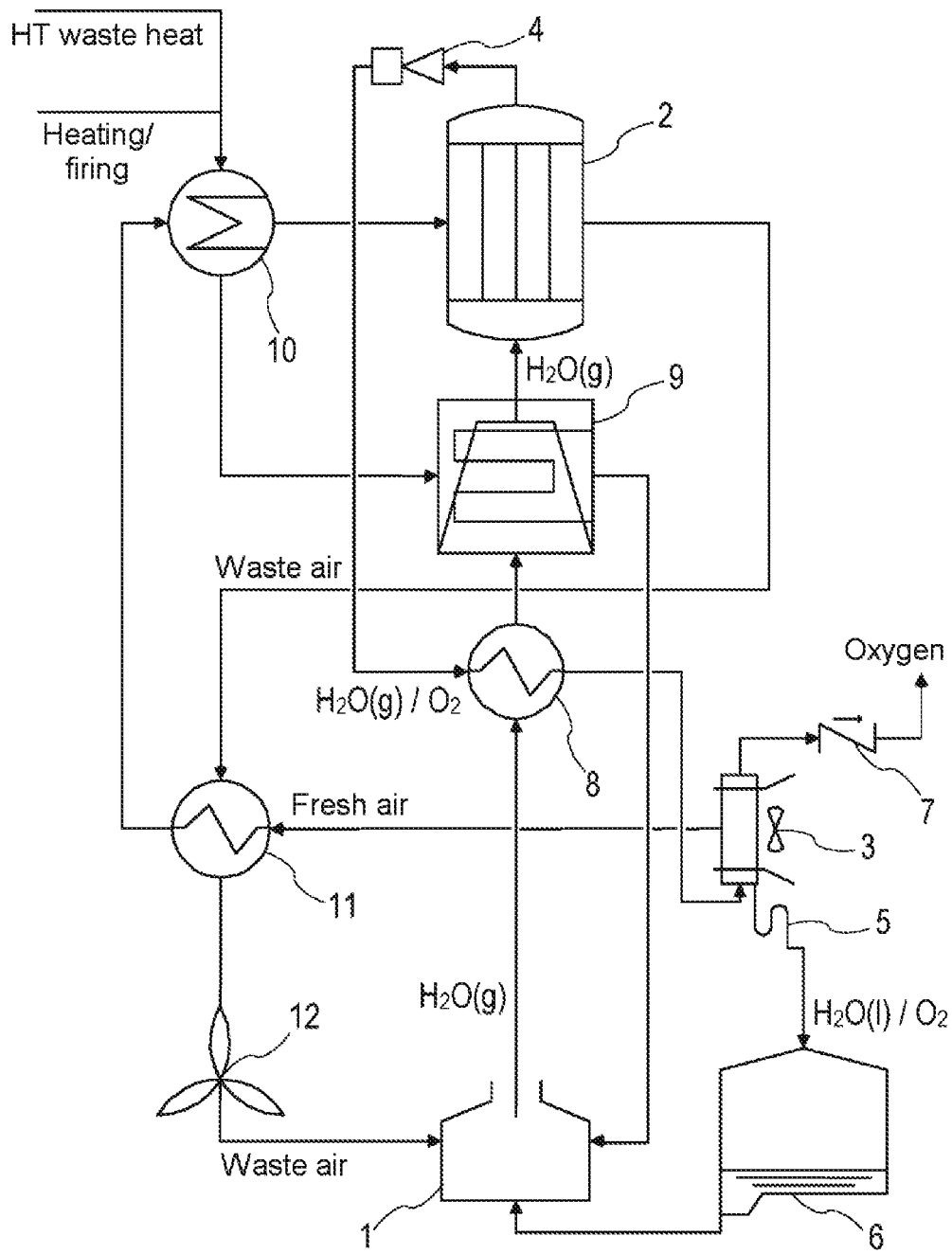
FIG. 2 shows a method scheme for generation of compressed oxygen with improved energy efficiency.

In order to improve the energy efficiency of the method, the media flows are passed advantageously via various heat exchangers, as is shown schematically in FIG. 2. Because the heat capacities of air and steam differ considerably, the heat contained in the corresponding gas flows is preferably recovered within the respective gas flows. As a result, their volume flows can be varied largely independently of one another without greatly affecting heat recovery. Accordingly, the fresh air is initially utilized for condensing the steam in the condenser 3, and is subsequently passed via the first heat exchanger 11, so that the fresh air is further preheated by the hot waste air. The pressure losses, which are higher in comparison to the process according to FIG. 1, are overcome by means of an extractor fan 12 on the waste air side.

Afterheating in the second heat exchanger 10 is accomplished ahead of the membrane module 2 by means of high-temperature waste heat or through external heat input; the second heat exchanger 10 may also be integrated into the membrane module 2. Given that small leakage flows between incoming and outgoing air stream are not critical to the operating regime, preference is given here to using inexpensive regenerative heat exchangers with high heat recovery. After the second heat exchanger 10, the waste heat stream is used first to heat steam in the superheater 9 and thereafter to evaporate the water in the evaporator 1. The evaporator 1 is also supplied, furthermore, according to FIG. 2 with the residual heat of the waste air coming from the extractor fan 12.

The hot $H_2O(g)/O_2$ gas mixture emerging from the membrane module 2 is guided via the nonreturn valve 4 and used subsequently to heat the entering steam in the third heat exchanger 8. Thereafter it is supplied to the condenser 3 for the separation of the water. In the condenser 3, the water is largely condensed out and is introduced via the siphon 5 into the condensate collector 6. As in the embodiment according to FIG. 1, the system pressure and hence also the oxygen pressure are set on the pressure control valve 7.

Figure 3:
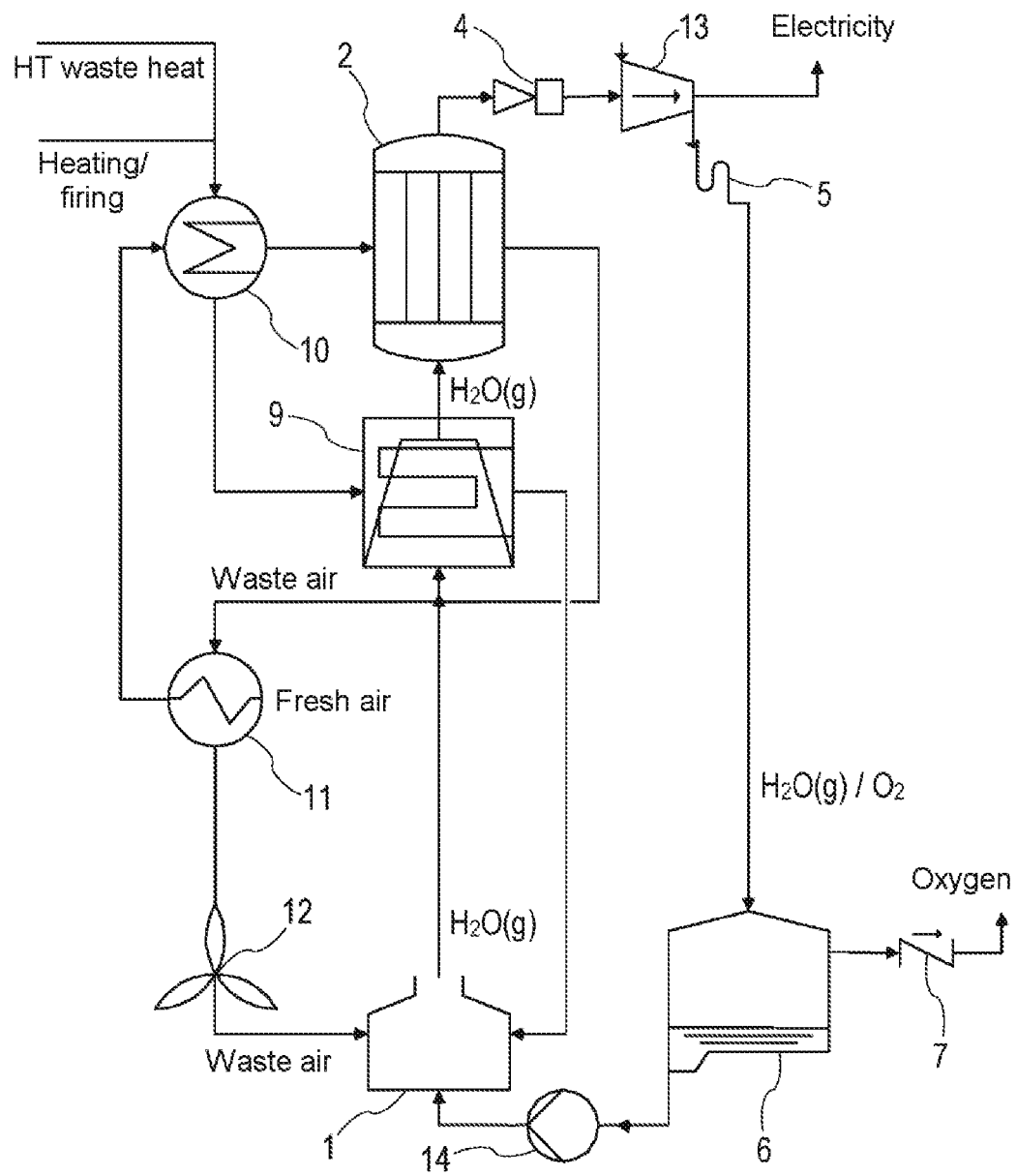
FIG. 3 shows a method scheme for combined generation of oxygen and electricity.

The automatic compression of the gas mixture through the entry of the oxygen into the steam may be utilized not only for generating compressed oxygen but also for the combined generation of electricity. The process depicted in FIG. 3, accordingly, contains a conventional steam turbine 13 for power generation, instead of the third heat exchanger 8 and the condenser 3.

Since a major part of the generated pressure of the $H_2O(g)/O_2$ gas mixture declines over the steam turbine 13, the hydrostatic pressure difference between condensate collector 6 and evaporator 1 is no longer sufficient to fill the evaporator 1 in the case of energy utilization. Additionally, therefore, a pump 14 is used in order to bring liquid water into the evaporator 1.

Relative to conventional energy generation via steam generation and turbine, the process of the invention offers the advantage that not only power but also superatmospheric-pressure oxygen are generated. Furthermore, because of the additional self-compression of the oxygen, the system pressure is typically slightly above the pressure which in the case of a conventional steam power plant would be achieved for the same temperature level and/or for comparable heat input.

Figure 4:
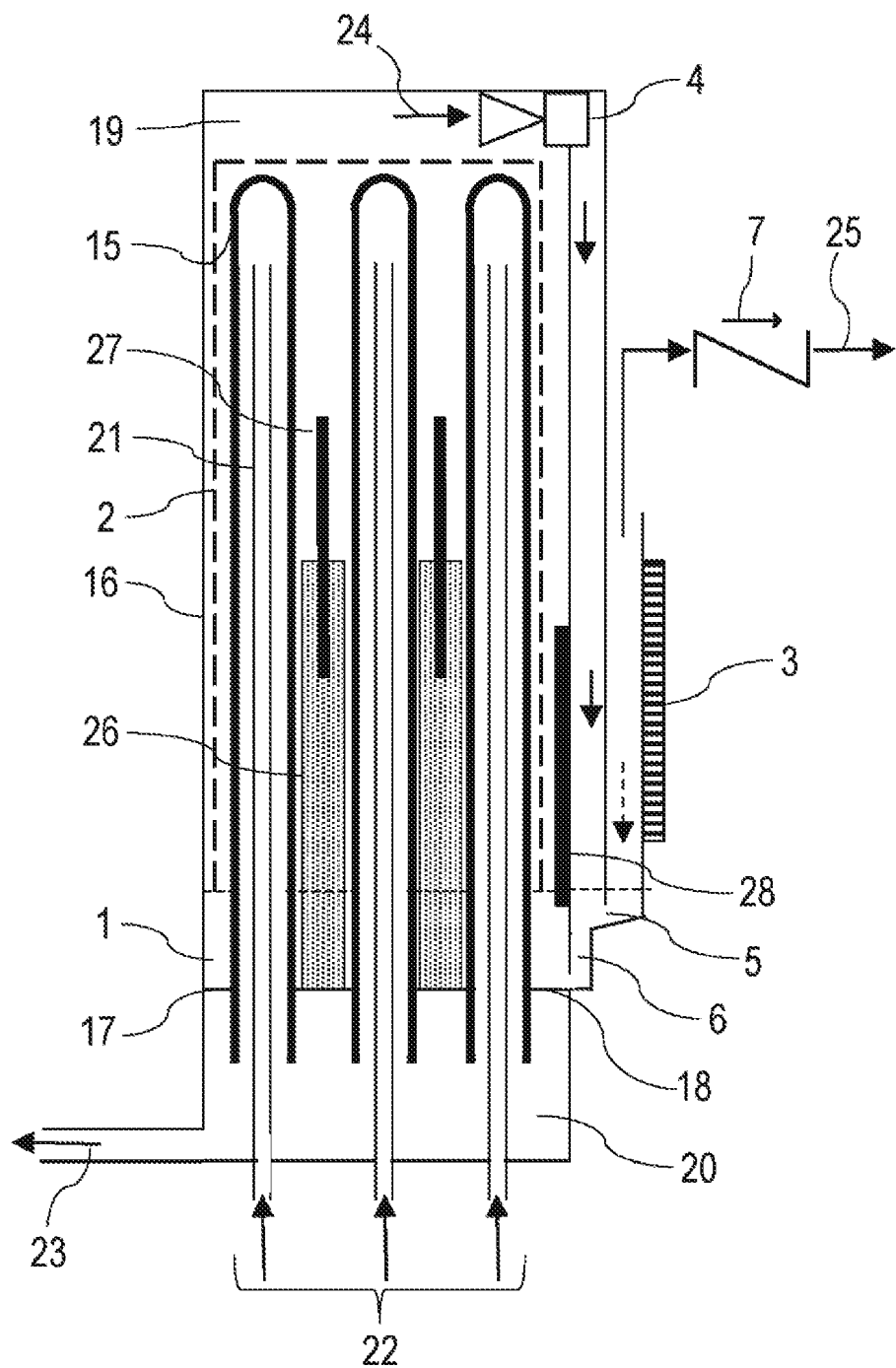
FIG. 4 shows a membrane module with steam purging for generating oxygen with superatmospheric pressure.

According to FIG. 4, a module for thermal generation and compression of oxygen in a pressure vessel 16 is shown, allowing 1 m³/h oxygen with 7 bar superatmospheric pressure to be generated.

The schematic construction is shown in accordance with FIG. 4. 400 membrane tubes 15 made of the BSCF material are used, with a length of 500 mm, an external diameter of 10 mm, and a wall thickness of 1 mm, in a temperature-stable and pressure-stable pressure vessel 16, which contains the majority of the process engineering components, such as membrane module 2, evaporator 1, condensate collector 6, siphon 5, nonreturn valve 4. The pressure vessel 16 is in turn introduced into a combustion chamber or flue gas channel (not shown) or is contacted therewith in such a way that a temperature of approximately 850° C. is attained in the pressure vessel 16. For this purpose, it is also possible for waste heat to be coupled otherwise into the pressure vessel 16. The membrane tubes 15 installed in the pressure vessel 16 are thereby heated to a temperature of around 850° C. over a length of at least 20 cm.

The open ends of the membrane tubes 15 are sealed in a gastight manner into a baseplate 17; sealing 18 may take place by means of conventional polymer seals or welding. Baseplate 17 and housing are designed so that the thermal stability of the seal 18 is not jeopardized and so that effective separation is ensured between the steam superatmospheric pressure region 19 and the waste air region 20.

Temperature-resistant air introduction tubes 21 made from scale-resistant steel or ceramic are inserted into the membrane tubes 15. In the hot region of the pressure vessel 16, the air introduction tubes 21 end in each case about 2 cm before the inner end of the single-sidedly closed membrane tube 15. The air introduction tubes 21 are passed through the waste air region 20 in a gastight manner. The air introduction tubes 21 guide fresh air via the air introduction openings 22 at room temperature into the membrane tubes 15. Following the emergence of the fresh air from the air introduction tube 21 at the hot membrane end, the fresh air has already been preheated to around 850° C.

Located on the baseplate 17 in the pressure vessel 16 is a water reservoir with a height of around 2 cm that constitutes an evaporator 1 integrated into the pressure vessel 16. From the hot region of the pressure vessel 16, heat conduction and radiation heat the water reservoir, and the water evaporates. The steam passes into the hot module region and acts as a low-oxygen sweep gas.

The oxygen partial pressure ratio between the inside of the membrane tube (about 21% $O_2$) and the steam superatmospheric pressure region 19, with about 0% $O_2$, and also the high temperatures, result in permeation of the oxygen through the membrane wall into the steam. The oxygen-depleted air in the membrane tube 15 is passed into the waste air region 20 in the gap between the membrane tube 15 and the air introduction tube 21, and leaves the pressure vessel 16 at the waste air outlet 23. The steam becomes enriched with the permeated oxygen, and an $H_2O(g)/O_2$ mixture 24 is formed in the top part of the pressure vessel 16. This mixture 24 is guided through the nonreturn valve 4 into the outer region of the pressure vessel 16 and subsequently through a submersion (siphon 5) within the condensate collector 6. The nonreturn valve 4 consists of a simple narrowing of an open cross section in the gas space, which for the through-puts specified below produces a flow rate of not less than 0.3 m/s. The gas stream composed of water and oxygen, after the submersion in hot liquid water, passes to the air-cooled condenser 3, where water is predominantly condensed out. Together with the water reservoir and/or the evaporator 1, the condensate collector 6 forms a common liquid container, with the component containers being connected to one another via a further submerged siphon within the liquid phase.

Excess liquid water from the condenser 3 flows back into the water reservoir. The gaseous oxygen can be taken off with superatmospheric pressure after the pressure control valve 7, at the oxygen withdrawal port 25.

In order to increase the rate of evaporation of the water, a capillary-active wick 26 can be used, which by capillary suction transports water from the water reservoir into the hot region of the module. The transfer of heat from the hot region of the module to the liquid water in the region of the evaporation zone may be additionally improved by means of a heat exchanger 27. If the heat exchanger 27 is configured, for example, as a heat pipe, substantially higher evaporation rates and higher oxygen production rates can be achieved as a result.

Further heat exchangers 28 may be used in order to transfer the heat of condensation from the hot $H_2O(g)/O_2$ mixture 24 from the steam into liquid water. As a result, a major part of the heat of condensation can be recovered and used for evaporation of the water, thereby improving the energy efficiency of the separation process.

Initial operation is accomplished by setting the pressure control valve 7 to 7 bar, reducing the air cooling of the condenser 3 by lining it with insulating material, and starting to heat the module. In the pressure vessel 16, the pressure of the resultant steam rises until it reaches the set superatmospheric pressure of 7 bar; in the water reservoir and/or in the evaporator 1, the evaporation temperature rises to about 170° C. When the operating temperature of 850° C. is reached in the hot reactor zone, the further supply of heat and the air cooling at the condenser 3 are set such that around 35 liters of liquid water evaporate per hour, meaning that around 45 standard $m^3$ of steam per hour are passed in the circuit. Moreover, the membrane reactor is supplied with around 45 standard $m^3$ of fresh air per hour.

After the initial operation time, the absolute pressure in the system is about 8 bar. Over the length of the membrane tubes 15, about 1 standard $in^3$ of oxygen per hour transfers from the air into the steam. The partial pressure of the oxygen in the steam after membrane contact reaches about 180 mbar. After the pressure control valve, 1 standard $m^3$ of oxygen per hour with a superatmospheric pressure of 7 bar is available.

LIST OF REFERENCE NUMERALS 1 evaporator
2 membrane module
3 condenser
4 nonreturn valve
5 siphon
6 condensate collector
7 pressure control valve
8 third heat exchanger
9 superheater
10 second heat exchanger
11 first heat exchanger
12 extractor fan
13 steam turbine
14 pump
15 membrane tubes
16 pressure vessel
17 baseplate
18 seal
19 steam superatmospheric pressure region
20 waste air region
21 air introduction tube
22 air introduction openings
23 waste air exit
24 $H_2O(g)/O_2$ mixture 25 oxygen withdrawal port
26 capillary-active wick
27 heat exchanger
28 further heat exchangers

What is claimed is:

1. A method for generating compressed oxygen, wherein the method uses one or more Mixed Ionic Electronic Conductor (MIEC) membranes, each having a sweep gas side and a feed gas side, and wherein
   (a) water is evaporated in an evaporator and passed in the form of steam to the one or more MIEC membranes in a heated state on the sweep gas side,
   (b) uncompressed air is passed to the feed gas side of the one or more MIEC membranes in a heated state, whereby oxygen from air permeates through the one or more MIEC membranes into the steam, forming a gas mixture of steam and oxygen,
   (c) the gas mixture of steam and oxygen, after passing through a nonreturn valve is supplied to a condenser, whereby steam largely condenses out again to form water, which water is supplied to the evaporator, and liberated oxygen is supplied via a pressure control valve to a gas reservoir,
   (d) establishment of an equilibrium of oxygen partial pressures is prevented by setting steam volume flow at levels ranging from 0.1 to 3 times air volume flow.

2. The method of claim 1, wherein the one or more MIEC membranes are heated by waste heat.

3. The method of claim 1, wherein a flow rate of the gas mixture through the nonreturn valve is set at a level of greater than 0.2 m/s.

4. The method of claim 1, wherein electrical energy is generated from the gas mixture under pressure.

5. The method of claim 1, wherein the one or more MIEC membranes are BSCF ($Ba_{0.5}Sr_{0.5}Co_{0.8}Fe_{0.2}O_{3-\delta}$) membranes.

6. The method of claim 1, wherein the one or more MIEC membranes are present in the form of a pressure-tight shell.

\* \* \* \* \*